United States Patent [19]
Sumner

[11] Patent Number: 6,009,173
[45] Date of Patent: Dec. 28, 1999

[54] ENCRYPTION AND DECRYPTION METHOD AND APPARATUS

[75] Inventor: Terence Edward Sumner, Azle, Tex.

[73] Assignee: Motorola, Inc., Schaumburg, Ill.

[21] Appl. No.: 08/791,968

[22] Filed: Jan. 31, 1997

[51] Int. Cl.$^6$ .................................................. H04L 9/32
[52] U.S. Cl. ................................ 380/21; 380/30; 380/49
[58] Field of Search ............................ 380/30, 21, 49

[56] References Cited

U.S. PATENT DOCUMENTS

| | | | |
|---|---|---|---|
| 5,283,832 | 2/1994 | Lockhart, Jr. et al. | 380/49 |
| 5,420,927 | 5/1995 | Micali | 380/25 |
| 5,475,758 | 12/1995 | Kikuchi | 380/25 |
| 5,532,920 | 7/1996 | Hartrick et al. | 364/419.1 |
| 5,588,060 | 12/1996 | Aziz | 380/3 |
| 5,604,804 | 2/1997 | Micali | 380/25 |
| 5,606,617 | 2/1997 | Brands | 380/30 |
| 5,751,813 | 5/1998 | Dorenbos | 380/49 |
| 5,812,671 | 9/1998 | Ross, Jr. | 380/49 |

*Primary Examiner*—Gilberto Barron, Jr.
*Attorney, Agent, or Firm*—Pablo Meles; Charles W. Bethards

[57] ABSTRACT

A method for efficient encryption and decryption (100) comprises the steps of encrypting a message (104) at a sending unit which is to be sent to a receiving unit using a message key (106) and appending to the message at the sending unit the message key encrypted (108 and 109) using a receiver's public key (110). Subsequently, a sender's certificate (116) is appended at a first server (302) and extracted at a second server (310). The message key is then decrypted at the receiving unit using a receiver's private key (140) to provide a decrypted message key. Subsequently the message is decrypted using the decrypted message key (142 & 143) and authenticated by comparing a pair of digest (152 and 156).

24 Claims, 4 Drawing Sheets

ENCRYPTION AND DECRYPTION METHOD AND APPARATUS

FIELD OF THE INVENTION

This invention relates in general to encryption and decryption and more specifically to efficient attachment of certificates in an encryption/decryption scheme.

BACKGROUND OF THE INVENTION

In a broad sense, efficient paging and security for wireless applications such as paging have opposing constraints. On the one hand, paging uses its non-real time capabilities to pack information efficiently to reduce the inefficient use of the wireless bandwidth. Security measures such as encryption on the other hand typically add to the information being transmitted over the air. The increased number of users and the increase in the average size of messages (including text, facsimile, audio and eventually video information) will only put further constraints on the use of the limited bandwidth provided.

In the normal process for passing a secured message with signature from a sender to a receiver, the steps in method 10 are typically followed as described with reference to FIG. 1. First the user creates a text message at step 12. Then, the user generates a digest of the text message using a one-way function (e.g. a secure hash function) at step 14. The user then attaches his signature at step 18 by first encrypting the digest using his signature or private key at step 20 and running it through an asymmetric engine 16, typically the private key corresponds to a public key found in a traceable certificate 26. The message and digital signature are then appended at step 22. The message with signature 24 is then catenated at step 27 to the traceable certificate 26 to create an authenticatable message 28. The authenticatable message 28 is then encrypted by using a symmetric engine 30 and a session key 32 to provide an encrypted message 40. The session key 32 (normally a random symmetric key) is itself encrypted using a recipient's asymmetric public key 34 and an asymmetric engine 36 to create a digital envelope 38. The encrypted message 40 is then appended at step 42 to the digital envelope 38 to create an encrypted message plus signature plus certificate with envelope 44.

With reference to FIG. 2, the typical decryption process begins by separating (46) the components of the encrypted message plus signature plus certificate with envelope 44 into the encrypted message 56 and a digital envelope 48. Preferably, digital envelope 48 is the same as digital envelope 38 from FIG. 1. The session key 54 (preferably session key 54 is the same as session key 32 of FIG. 1) is recovered (decrypted) by the recipient using their private key 52 (corresponding to the recipient's private key 34) and running the digital envelope 48 through an asymmetric engine 49 using the private key 52. The encrypted message 56 with signature is decrypted using the session key 54. In other words, by using the session key 54 the encrypted message 56 is run through a symmetric engine 58 to obtain an authenticatable message 60 (which should be the same as the authenticatable message 28 of FIG. 1). Thus, the recipient can confirm (to a reasonable degree) the identity of the sender of the message as will be seen in the next few steps. Next, the authenticatable message is separated (62) into a certificate 64 and a separate signed message 68 corresponding respectivley to the certificate 26 and signed message 24 of FIG. 1. The signed message 68 itself will also be separated (70) into a readable text message 80 and a digital signature 72 corresponding respectively to the message 12 and digital signature 18 of FIG. 1. A sender's public key 66 is extracted from the certificate 64 and then used to decrypt the signature into a digest 77. In other words, the digital signature 72 is passed through an asymmetric engine 74 using the sender's public key 66 to provide a digest 77 which should be a copy of the actual digest. The text message 80 is run through the same (hash) function (as in step 14 of FIG. 1) to retrieve the actual digest 79. The actual digest 79 and the digest 77 are compared at step 76 to verify proper signature. Note that in the example above, the certificate is embedded in the encrypted message and significantly increases the size of the encrypted message.

DETAILED DESCRIPTION

Figure 3:
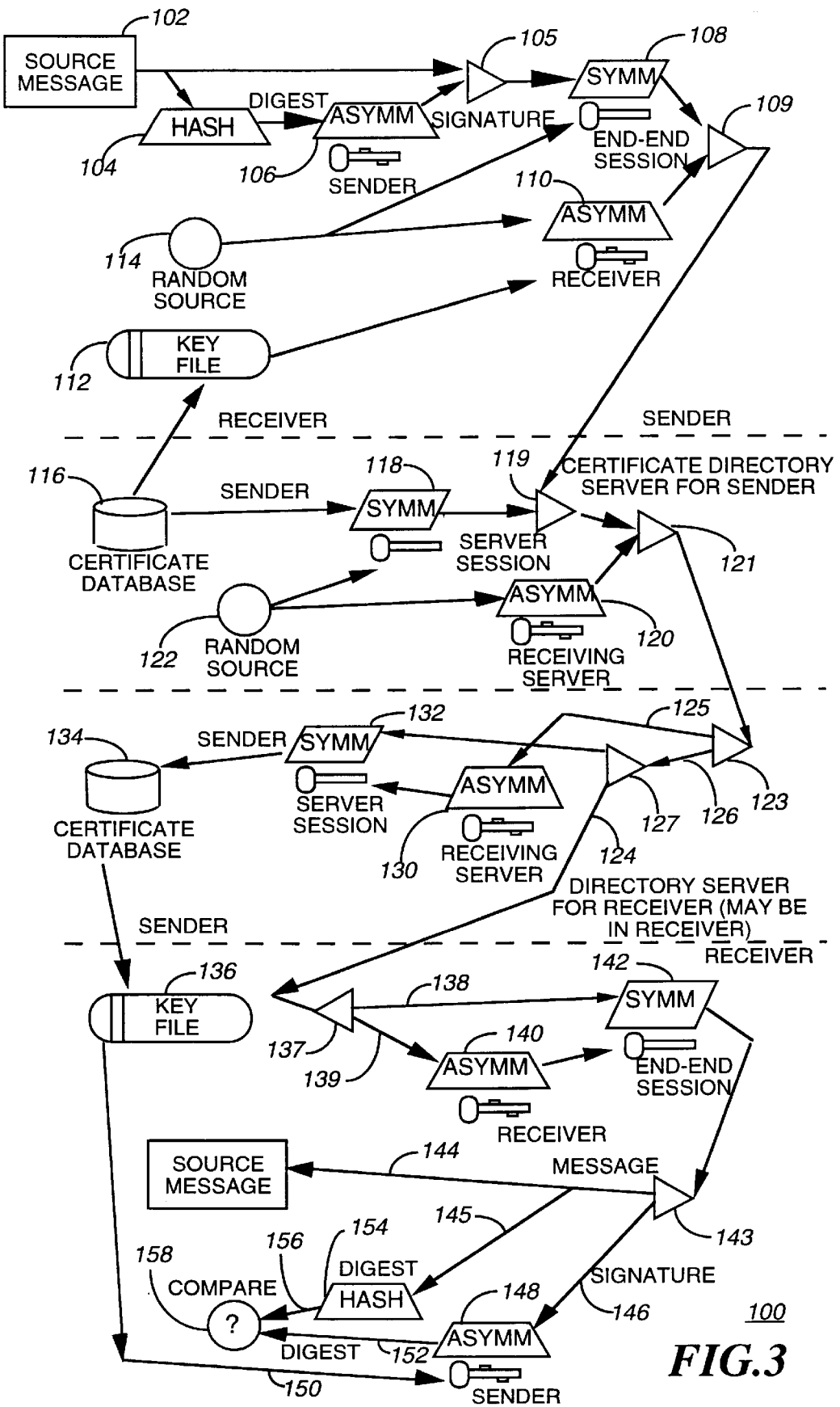
FIG. 3 is a flow chart of an encryption method in accordance with an embodiment of the present invention.

Referring to FIG. 3, a method for efficient encryption and decryption is shown comprising the steps of encrypting a message 102 at 5 a sending unit which is to be sent to a receiving unit using a message key 112. Then, the message key is appended to the message at the sending unit using a receiver's public key 110. Preferably, this step comprises the steps of adding a signature by generating a digest of the message using a one-way function 104 and encrypting the digest using the sender's private key 106 to create a signed message, the private key corresponding to the public key embedded in a sender's certificate (116). Subsequently a sender's certificate is appended at a first server. Next, the sender's certificate is extracted (134) at a second server and then the message key is decrypted at the receiving unit using a receiver's private key 140 to provide a decrypted message key. Subsequently, the message is decrypted using the decrypted message key. Additionally the method can further comprise the steps of encrypting the signed message using a sender-receiver session key 108 providing an encrypted signed message, and decrypting the encrypted signed message at the receiver using another sender-receiver session key 142. Preferably, the sender-receiver session key is encrypted using a receiver's public key retrieved from the first server and catenated to the signed message as an envelope.

In another embodiment of the present invention, a method of efficiently transporting an encrypted signed message with envelope from a sender to a receiver using a sending server and a receiving server, comprises the steps of encrypting a certificate using a server-to-server session key 118 to create an encrypted certificate and catenating the encrypted certificate with an envelope containing the server-to-server session key encrypted with a receiving server's asymmetric public key 120 to create an encrypted certificate with envelope and then catenating the encrypted signed message with envelope to the encrypted certificate with envelope. The method can further comprise the steps of decrypting the server-to-server session key using the receiving server's private key 130 as well as the step of separating the certificate from the encrypted signed message with envelope and further decrypting the certificate using the server to server session key 132. Additionally, the method could include the step of extracting the sender's public key from a certificate at the receiving server. At the receiving unit, the envelope can be separated from the encrypted signed message, wherein the envelope is decrypted to provide a sender-receiver session key. Also the encrypted signed message and signature can be decrypted using the sender-receiver session key. As will be explained in further detail, the signature at the receiver can be decrypted into a digest using the sender's public key for use in authentication of the signature associated with the message. Thus, authentication is done by separating the message by passing the message through a one way function and obtaining an actual digest which is compared with the digest found by decrypting the signature using the sender's public key.

Again, referring to FIG. 3, the method 100 illustrates how an encrypted message is sent from a sending unit to a receiving unit without having to transmit the certificate to the receiving unit which is particularly useful when the path between the sending unit and receiving unit is wireless. As before, the user creates a text message at step 102 and subsequently generates a digest of the text message using a one-way function (e.g. secure hash) at step 104. The user makes his signature by encrypting the digest using his signature key through an asymmetric engine 106 and appending the result to the message at step 105, wherein the signature key is typically a private key corresponding to the public key found in a certificate, preferably a traceable certificate. The signed message is then encrypted using a sender-receiver session key at step 108 (normally a random symmetric key). The sender-receiver session key itself is encrypted using the receiver's public key at step 110 and catenated at step 109 to the signed message as an envelope. Preferably, a random source 114 is used to generate the keys at steps 108 and 110. The receiver's public key can be resident in a key file 112 or preferably extracted from a sender's certificate database 116 as needed. The traceable certificate or sender's certificate (116) is encrypted using a server-server session key at step 118 (normally a random symmetric key) and then catenated at step 119 to the encrypted signed message with envelope. Optionally, this is the same session key as sender-receiver key, but this requires the server be trusted. The server-server session key (normally a random symmetric key also) is itself encrypted using the receiving server's asymmetric public key at step 120 and catenated at step 121 to the encrypted signed message with envelope plus encrypted certificate. Preferably, a random source 122 is used to generate the keys at steps 118 and 120.

At the receiving end (from the server-to-server perspective), the encrypted server-server session key is recovered by the receiving server using its asymmetric private key at step 130. The encrypted certificate (126) is separated at steps 123 and 127 from the encrypted signed message with envelope (124 or 125), and decrypted using the session key at step 132. The sender's public key is preferably extracted from the certificate in the certificate database 134 and authentication is done if necessary by sending the needed information to a key file 136 for later comparison. Authentication preferably involves a traceable certificate that allows for the tracing of origin of the authority signing as to the authenticity of the certificate holder. The information embedded in a certificate could include a signature of a higher authority linking the hierarchy of traceable authorities. Thus, authentication is performed by checking the signature of the authority attesting to the certificate's authenticity and the public key is then filed in the key file, along with some identifying information and validity, having been authenticated. If the receiver has the public key already, no action is taken by the server, except to identify proper public key (the sender's) to the receiver. If the receiver does not have the key, the server may send the whole certificate or only part of the certificate, (e.g. the public key), as mutually agreed between the sending and receiving parties. Next, the envelope (138) is separated at step 137 from the encrypted signed message (139) and decrypted by the receiver using the sender-receiver session key at step 142. The session key (142) is used to decrypt the message plus signature. The signature (146) is decrypted with sender's public key (which can be obtained from the key file 136 if not already available) at step 148 to provide the digest (152) after the message is separated from the signature at step 143. The message is separated (144 and 145) and passed through the one-way function 154 to get the actual digest 156 of the message. The digest 152 is compared with the actual digest 156 to verify proper signature. Note that authentication of signature is optional, but desirable especially for financial applications.

As shown above, the over-the-air traffic is reduced by not sending the certificate embedded in the inbound message but instead having the certificate or directory server append it from a file.

Typically, these certificates are thousands of bits in length, compared to only a few hundred for the whole message and signature. Certificates are normally covered by encryption to provide some degree of privacy to the transactors.

The server, in effect, provides the sender or receiver or both with a public-key (asymmetric-key) certificate directory service, which is the new arrangement compared to prior schemes. Symmetric encryption is shown between the sending unit (messaging device) and the receiving unit and is labeled "end-end session". This is optional but likely and would be used if privacy of the transaction, not just authentication and signature, were required. This encryption most likely would be symmetric because of its simplicity and efficiency, but asymmetric could also be used.

Addressing, control and authentication information are not shown passing between sender and server or carrier, but these are necessary for messaging purposes. The authentication is used between the server and the device, to assure the server that the device is the true source so that the proper certificate can be appended. Control would entail such features as priority of processing and delivery, level of security, and other ancillary functions. Addressing may be done in the clear or through the server-device encryption, if present. Since privacy is becoming more of an issue every day, even addressing may need to be protected from prying eyes when using a broadcast medium.

Figure 1:
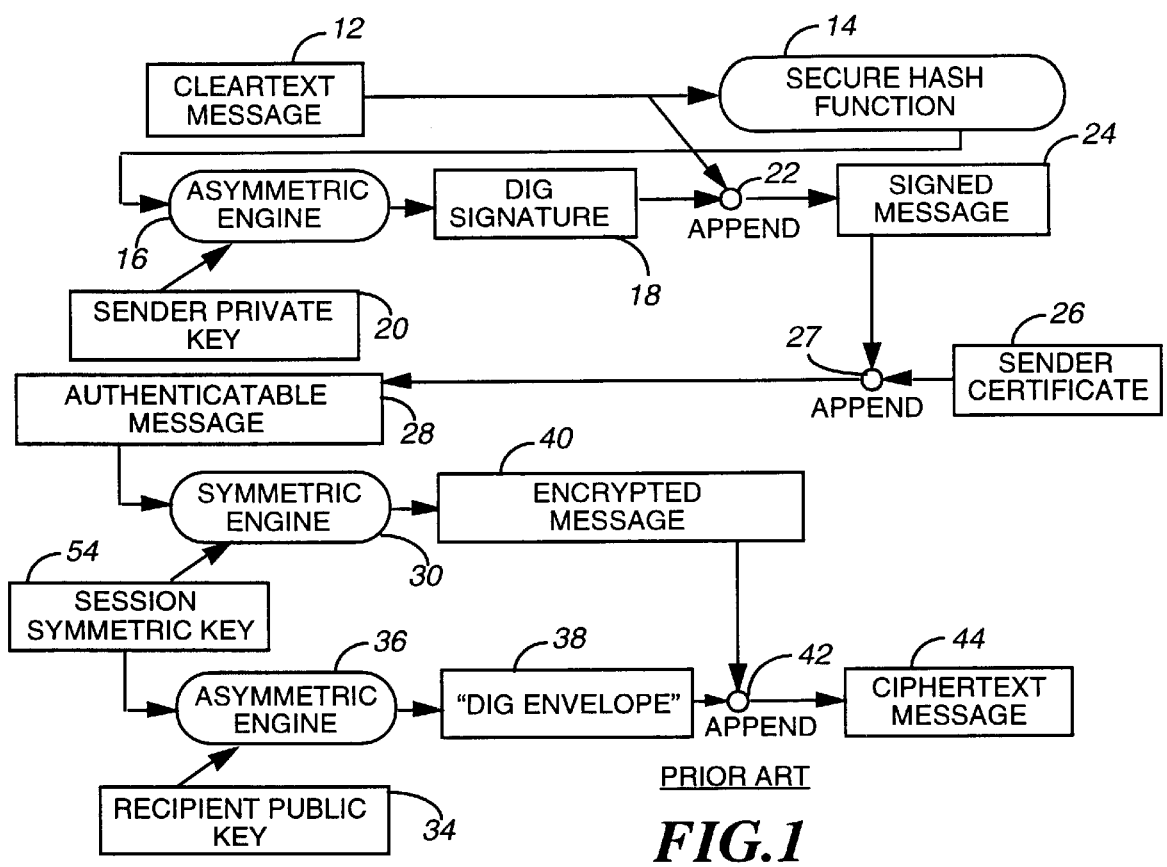
FIG. 1 is a flow chart of an known encryption method for sending information.
Figure 5:
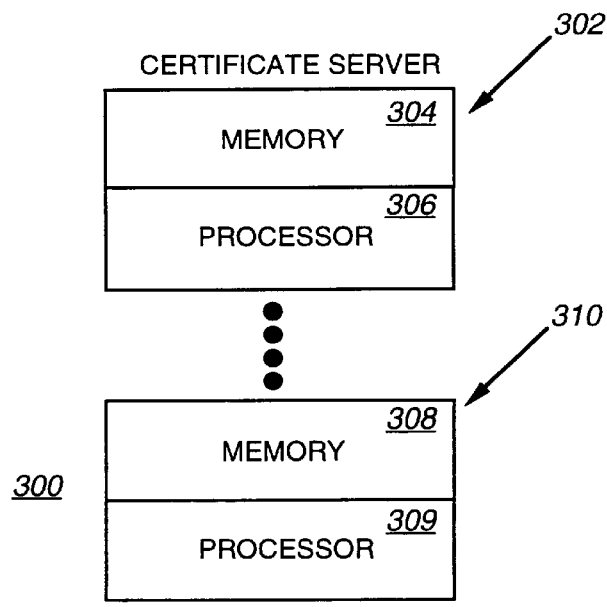
FIG. 5 is a block diagram of a certificate server in accordance with the present invention.
Figure 2:
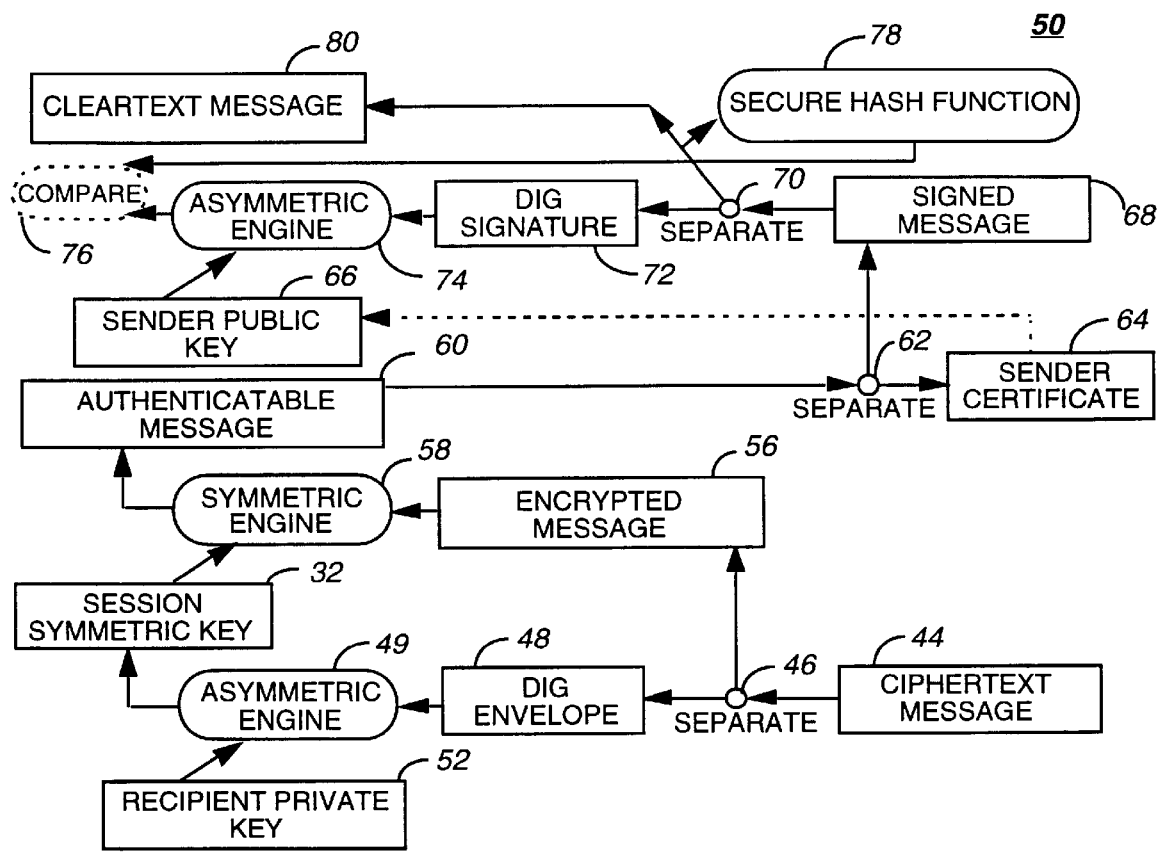
FIG. 2 is a flow chart of an known decryption method for receiving information.

Referring to FIG. 5, a remote certificate server 300 for use in wireless communication comprises a sender server portion 302 for receiving an encrypted wireless message with envelope as well as a memory 304 for storing the encrypted wireless message. The sender server portion also comprises a processor 306 for encrypting a certificate with a server to server session key to provide an encrypted certificate. The processor 306 also appends the encrypted certificate with the encrypted wireless message with envelope to provide an encrypted certificate and wireless message with envelope. The processor 306 further encrypts the server to server session key by using a receiver server portion's asymmetric public key to provide an encrypted server to server session key, wherein the encrypted server to server session key is appended to the encrypted certificate and wireless message with envelope. The remote certificate server 300 further comprises a receiver server portion 310 for receiving the encrypted server to server session key appended to the encrypted certificate and wireless message with envelope. The receiver server portion 310 preferably comprises a memory 308 for storing the encrypted server to server session key appended to the encrypted certificate and wireless message with envelope and a processor 309 for recovering the server to server session key using an asymmetric private key corresponding to the receiver server portion's asymmetric public key and for separating the encrypted certificate from the encrypted wireless message with envelope and for decrypting the encrypted certificate. It should be noted that the sender server portion 302 and the receiver server portion 310 of the remote certificate server 300 can either be hardwired together or coupled together via a wireline network or wireless network as desired.

The receiver's public key or the receiving unit's certificate must be transferred from the server to the sender. The server can send the whole certificate and allow the sender to authenticate the embedded information, or the sender and server could have a trusted relationship allowing the sender to get just the key portion of the certificate for placement in a key file as shown with step 112 in FIG. 3. For minimizing problems later the server should also advise the expiration or validity of the key, and for minimizing traffic later sender and server should agree on a token to represent certificate holder, such as a tag or name.

Referring again to FIG. 3, the end-end session key may be symmetric as noted previously. Typically, symmetric keys require additional synchronization (e.g. start vector) information to work properly. This is not shown explicitly in the diagram. This also applies to the server-server session key. The certificate (plus any additional routing and relaying information) is covered by this session key. Synchronization information for this key may be derived from the end-end session key's synchronization or other information already on the channel to lower overhead. The key itself may be the same key used for the end-end session, but this would create a potential security problem. The problem is that the servers would be fully capable of decrypting the message. If both servers are trusted by both sender and receiver, this poses no problem. Avoiding this problem and a general solution would require the server-server session key to be unique from the end-end session key.

The receiver and the receiving server can be one and the same entity, making life simple. The sender's certificate can be separated from the incoming message and authenticated (not shown) and filed away. When a messaging device is the receiver of such a message reducing over-the-air traffic can be similarly reduced, but it is somewhat more difficult. The sender's certificate in its entirety is held by the receiver or just the key of the sender. The sending server does not suthomatically send the certificate unless needed, which reduces traffic to only a single transmission of the certificate in many cases. Further, the receiver and receiving server may be connected to a wired network where traffic considerations are less constraining. The message may be decrypted when the messaging device has just the key, but traceability is lost unless the whole certificate is held by the messaging device until verified. The sender and sending server, likewise, can be one and the same entity, especially if there is no wireless path from the sender.

The receiving server may be trusted or untrusted. If trusted, then the messaging device holds just the key. If untrusted, then the messaging device holds the whole certificate. The implication on memory and processing in the device for untrusted is to require much larger capacity, at least temporarily while the certificate is being authenticated. Once authenticated, only the key and its expiration need be kept. Over-the-air traffic also increases to allow transmission of certificates to recipients and their authentication from the root authority. The server could strip off the certificates that are not needed and simply send the ones that have never been sent before. This is like the sending server's treatment or receiver certificate with tags or names. Even if the certificate has already been sent once if the receiver does not recognize the tag or name the server uses, it can refresh the certificate or key. An example of several of these embodiments can be seen with respect to FIG. 4.

Figure 4:
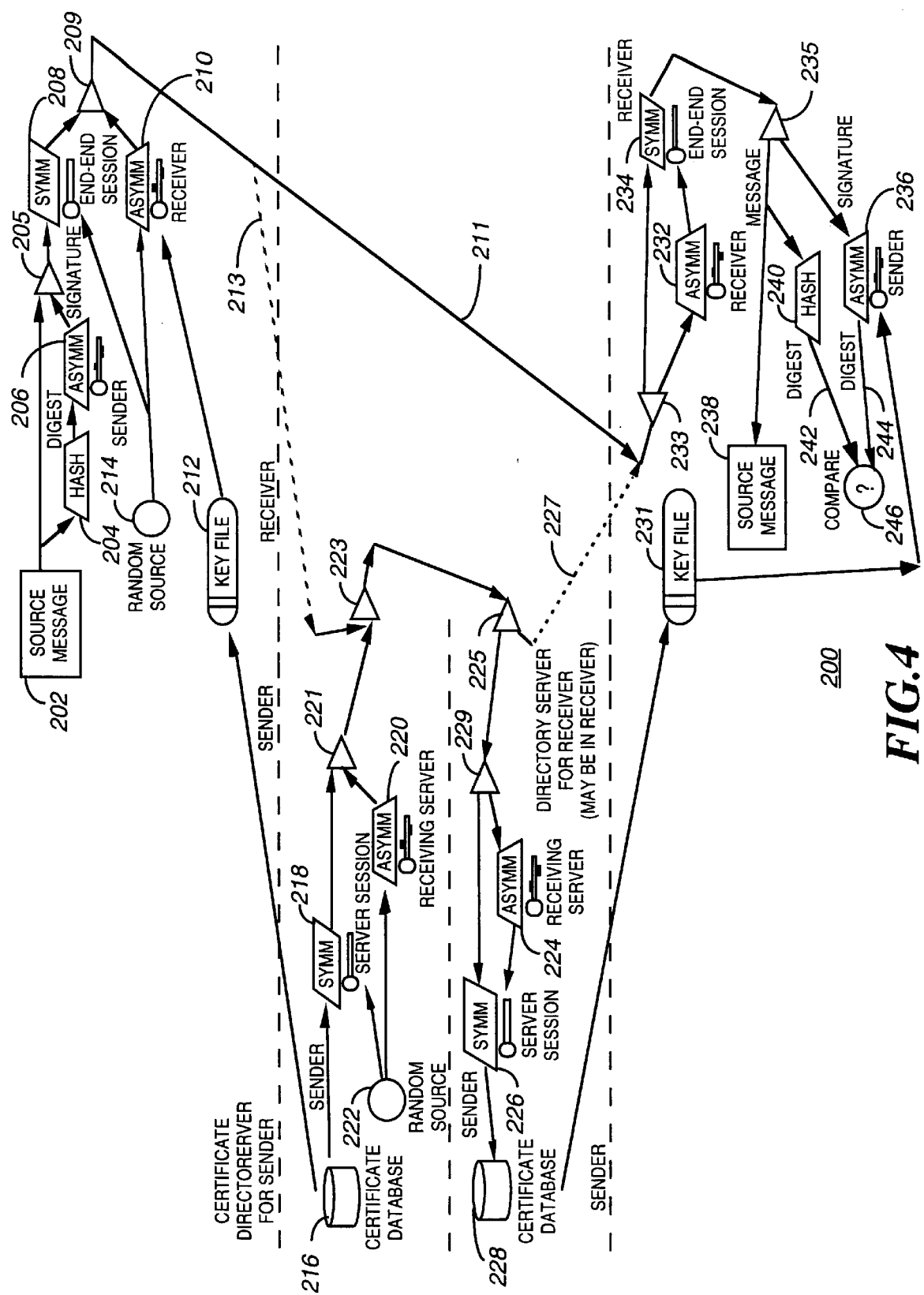
FIG. 4 is another flow chart of an encryption method in accordance with an alternative embodiment of the present invention.

FIG. 4 illustrates an alternative embodiment of a method for sending a message from a sending unit to a receiving unit. In particular, the method 200 illustrates how an encrypted message is sent from a sending unit to a receiving unit without necessarily having to transmit a certificate to the receiving unit every time a message is sent. As before, the user creates a text message at step 202 and subsequently generates a digest of the text message using a one-way function (e.g. secure hash) at step 204. The user makes his signature by encrypting the digest using his signature key through an asymmetric engine 206 and appending the result to the message at step 205, wherein the signature key is typically a private key corresponding to the public key found in a traceable certificate. The signed message is then encrypted using a sender-receiver session key (or end-to-end session key) at step 208 (normally a random symmetric key). The sender-receiver session key itself is encrypted using the receiver's public key at step 210 and catenated at step 209 to the signed message as an envelope. Preferably, a random source 214 is used to generate the keys at steps 208 and 210. The receiver's public key can be resident in a key file 212 or preferably extracted from a sender's certificate database 216 as needed.

The sending unit can send the signed message with envelope directly to the receiving unit without requiring anything further from the servers at step 211. For instance, if messages were previously sent between the sending unit and the receiving unit, the receiving unit may already have a certificate available (at the receiving unit) to authenticate the message. Alternatively, the receiving unit may only require a key from a key file (231) to authenticate the message. In other words, the receiving unit may only require portions of information from the certificate (rather than the entire certificate) that would aide in reducing the over-the-air traffic seen between two frequent communicators such as a merchant and frequent purchaser.

Thus, in one embodiment of the present invention, the sending of a message (211) from a sending unit to receiving unit could entail an alternative path 213 where the messages are catenated at step 223 with an encrypted traceable certificate or sender's certificate (216) with envelope. The certificate 216 is preferably encrypted using a server-server session key at step 218 (normally a random symmetric key) and then catenated at step 221 with the receiving server's public key 220 to provide an encrypted certificate with envelope. Preferably, a random source 222 is used to generate the keys at steps 218 and 220. The encrypted message with envelope and the encrypted certificate with envelope can either run through a similar decryption algorithm as previously described with respect to FIG. 3, or the encrypted message can take the alternate route 227 through step 225 to the receiving unit where no information or minimal information is required from the receiving server to decrypt and/or authenticate the encrypted message.

In the event the entire certificate or a portion of the certificate is required, the envelope and encrypted certificate are separated at step 229. The receiving server's private key 224 is used to authenticate the server sending the information and the server-server session key 226 is used to decrypt the certificate which is stored in the certificate database 228. The certificate or appropriate portion of the certificate (such as the key) can be forwarded to the key file 231 for subsequent authentication by the receiving unit. Whether the signed encrypted message with envelope is sent by path 211 or 227, the envelope is separated from the signed encrypted message at step 233. The receiver's public key at step 232 is used to strip away the envelope and an end-end session key at step 234 decrypts the signed encrypted message. Once again, the signed encrypted message itself is separated at step 235 into a message and signature. The message is passed through a hash function 240 to get the actual digest 242 of the message. The signature is decrypted using the sender's public key at step 236 to obtain the digest 244. Then the digest 244 is compared with the actual digest 242 to verify proper signature. Note again that authentication of signature is optional, but desirable especially for financial applications.

FIG. 4 illustrates the two alternatives in accordance with the present invention. In a first case, the message is encrypted and delivered without a certificate to the receiving unit (211) while separately (triggered by the sending unit) the servers communicate and decide if a copy of the certificate needs to be delivered to the receiving unit (preferably in an encrypted form as shown). The receiving server then decrypts, stores, and delivers the certificate or the key of the certificate as needed by the receiving unit. In a second case, the message is encrypted and then appended to the certificate. The certificate itself is preferably encrypted by the server. The encrypted message as well as the encrypted certificate are then delivered to the receiving server, wherein the receiving server detaches the certificate, decrypts it, stores it and delivers either the certificate or the key to the receiving unit.

In a broad aspect of the invention, a method of efficiently transporting a signed message from a sender to a receiver using a sending server and a receiving server comprises the steps of sending a signed message from a sending unit for receipt at a receiving unit and then subsequently appending a sender's certificate at a first server to the signed message. The sender's certificate and even the signed message may optionally be encrypted. At a second server, the sender's certificate is extracted and thus the signed message is received and read at the receiving unit using a set of information extracted from the sender's certificate. The set of information is preferably selected from the group of name, a public key, signature authority, expiration date, validity period, date of issue, control numbers, or other information as appropriate.

A personal messaging unit (PMU) or subscriber unit capable of receiving or coupling to a smartcard is within contemplation of the claims of the present invention. Actual implementation could include a PMU with contacts for inserting a smartcard, or a PMU with a separate interface unit for smartcards connected by cable to the PMU, or a PMU with an embedded smartcard that is either fixed or removable. The certificate server may be implemented as a self-contained unit (even internal to the PMU) or as a software program running within a messaging switch (paging or messaging terminal) or as an external switch outside the paging system domain altogether. It would be assumed that the certificate server would provide for fully compatible protocol support with the correspondent entity, including use of appropriate encryption schemes and access to root authorities for authentications.

It should be understood that the disclosed embodiments are merely examples and the invention is not restricted thereto. It will be understood by those skilled in the art that variations and modifications can be made within the scope and spirit of the present invention as defined by the appended claims.

What is claimed is:

1. A method for efficient encryption and decryption, comprising the steps of:

encrypting a message at a sending unit which is to be sent to a receiving unit using a message key;

appending to the message at the sending unit the message key encrypted using a receiver's public key;

subsequently appending a sender's certificate at a first server;

extracting the sender's certificate at a second server;

decrypting the message key at the receiving unit using a receiver's private key to provide a decrypted message key;

subsequently decrypting the message using the decrypted message key.

2. A method for efficient encryption and decryption of claim 1, wherein the step of encrypting a message further comprises the step of adding a signature by generating a digest of the message using a one-way function and encrypting the digest using a private key to create a encrypted signed message, the private key corresponding to a public key embedded in the sender's certificate.

3. A method for efficient encryption and decryption, comprising the steps of:

encrypting a message at a sending unit which is to be sent to a receiving unit using a message key;

appending to the message at the sending unit the message key encrypted using a receiver's public key;

subsequently appending a sender's certificate at a first server;

encrypting the message and the sender's certificate using a server session key to provide an encrypted message with certificate, decrypting the encrypted message and sender's certificate at a second server using the server session key extracting the sender's certificate at the second server;

decrypting the message key at the receiving unit using a receiver's private key to provide a decrypted message key; and subsequently decrypting the message using the decrypted message key.

4. The method of claim 3, wherein the server session key is encrypted using a receiving server's public key retrieved from the first server and catenated to the encrypted signed message with certificate as an envelope.

5. The method of claim 2, wherein the method further comprises the steps of encrypting the message with the sender's certificate using a server session key providing an encrypted signed message with certificate, and decrypting the encrypted signed message with certificate at the second server using the server session key.

6. The method of claim 5, wherein the server session key is encrypted using a receiving server's public key retrieved from the first server and catenated to the encrypted signed message with certificate as an envelope.

7. A method of efficiently transporting an encrypted signed message with envelope from a sender to a receiver using a sending server and a receiving server, the receiving server using an asymmetric public-private pair of keys, the method comprising the steps of:

encrypting a certificate using a server-to-server session key to create an encrypted certificate and catenating the encrypted certificate with an envelope containing the server-to-server session key encrypted with a receiving server's asymmetric public key to create an encrypted certificate with envelope; and catenating the encrypted signed message with envelope to the encrypted certificate with envelope.

8. The method of claim 7, wherein the method further comprises the steps of decrypting the server-to-server session key using the receiving server's private key.

9. The method of claim 8, wherein the method further comprises the step of separating the certificate from the encrypted signed message with envelope and further decrypting the certificate using the server to server session key.

10. The method of claim 9, wherein the method further comprises the step of extracting the sender's public key from a certificate at the receiving server.

11. The method of claim 10, wherein the method further comprises the step at a receiver of separating the envelope from the encrypted signed message and decrypting the envelope to provide a sender-receiver session key.

12. The method of claim 11, wherein the method further comprises the step at the receiver of decrypting the encrypted signed message and signature using the sender-receiver session key.

13. The method of claim 12, wherein the method further comprises the step at the receiver of decrypting the signature into a digest using the sender's public key.

14. The method of claim 13, wherein the method further comprises the step at the receiver of authenticating the signature associated with the message by separating the message by passing the message through a hash function and obtaining an actual digest which is compared with the digest found by decrypting the signature using the sender's public key.

15. A remote certificate server for use in wireless communication, comprising:

a sender server portion for receiving an encrypted wireless message with envelope, comprising:

a memory for storing the encrypted wireless message; and a processor for encrypting a certificate with a server to server session key to provided an encrypted certificate and for appending the encrypted certificate with the encrypted wireless message with envelope to provide an encrypted certificate and wireless message with envelope, the processor further encrypting the server to server session key by using a receiver server portion's asymmetric public key to provide an encrypted server to server session key, wherein the encrypted server to server session key is appended to the encrypted certificate and wireless message with envelope.

16. The remote certificate server of claim 15, wherein the remote certificate server further comprises a receiver server portion for receiving the encrypted server to server session key appended to the encrypted certificate and wireless message with envelope, wherein the receiver server portion comprises:

a memory for storing the encrypted server to server session key appended to the encrypted certificate and wireless message with envelope; and a processor for recovering the server to server session key using an asymmetric private key corresponding to the receiver server portion's asymmetric public key and for separating the encrypted certificate from the encrypted wireless message with envelope and for decrypting the encrypted certificate.

17. The remote certificate server of claim 16, wherein sender server portion and the receiver server portion are coupled via a wireline network.

18. A method of efficiently transporting an encrypted signed message with envelope from a sender to a receiver using a sending server and a receiving server, the receiving server using an asymmetric public-private pair of keys, the method comprising the steps of:

sending the encrypted signed message to the receiver from the sender which triggers an inquiry between the sending server and the receiving server as to whether a certificate needs to be delivered to the receiver;

sending the certificate to the receiver if there is no prior receipt of a certificate or if the certificate is expired or otherwise invalid, otherwise sending portions of the certificate as needed as determined by the inquiry between the sending server and the receiving server, wherein if the inquiry between the sending server and the receiving server determines that the certificate or portions thereof needs to be sent to the receiver, the method then further comprises the steps of:

encrypting the certificate or portions thereof using a server-to-server session key to create an encrypted certificate and catenating the encrypted certificate with an envelope containing the server-to-server session key encrypted with a receiving server's asymmetric public key to create an encrypted certificate with envelope;

catenating the encrypted signed message with envelope to the encrypted certificate with envelope; and decrypting the encrypted certificate or portions thereof as needed by the receiver.

19. The method of claim 18, wherein the method further comprises the steps of decrypting the server-to-server session key using a receiving server'private key.

20. The method of claim 19, wherein the method further comprises the step of separating the certificate from the encrypted signed message with envelope and further decrypting the certificate using the server to server session key.

21. The method of claim 20, wherein the method further comprises the step of extracting the sender's public key from the certificate at the receiving server.

22. A method of efficiently transporting a signed message from a sender to a receiver using a sending server and a receiving server, the method comprising the steps of:

sending a signed message from a sending unit for receipt at a receiving unit;

subsequently encrypting and appending a sender's certificate as encrypted at a first server to the signed message;

extracting the sender's certificate at a second server; and receiving the signed message at the receiving unit and reading the message at the receiving unit using a set of information from the sender's certificate.

23. The method of claim 22, wherein the step of receiving the signed message includes the step of using the set of information selected from the group of name, public key, signature authority, expiration date, validity period, date of issued, and control numbers.

24. The method of claim 22, wherein the step of sending a signed message further comprises the step of sending an encrypted signed message.

* * * * *